Nov. 10, 1936.                P. H. CHASE ET AL                2,060,036
                              ELECTRIC CABLE
                            Filed Oct. 28, 1929

Philip H. Chase,
John R. Falconer,
Delon G. Haynes,
Inventors
Attorney

Patented Nov. 10, 1936

2,060,036

UNITED STATES PATENT OFFICE 2,060,036

ELECTRIC CABLE

Philip H. Chase, Bala-Cynwyd, and John R. Falconer, Conshohocken, Pa.; said Falconer assignor to said Chase Application October 28, 1929, Serial No. 402,976

8 Claims. (Cl. 173—266)

This invention relates to cable, and with regard to certain more specific features, to tubing or tape for use in connection with cable.

Among the several objects of the invention may be noted the provision of an improved form of hollow tape for application to cable and the like; and the provision of a product of the class described which is simple to manufacture, yet strong and rugged. Other objects will be in part obvious and in part pointed out hereinafter.

The invention accordingly comprises the elements and combinations of elements, features of construction, and arrangements of parts which will be exemplified in the structures hereinafter described, and the scope of the application of which will be indicated in the following claims.

In the accompanying drawing, in which are illustrated several of various possible embodiments of the invention, Fig. 1 is a cross section of a cable illustrating an application of the tubing of the invention herein described;

Similar reference characters indicate corresponding parts throughout the several views of the drawing.

Figure 1:
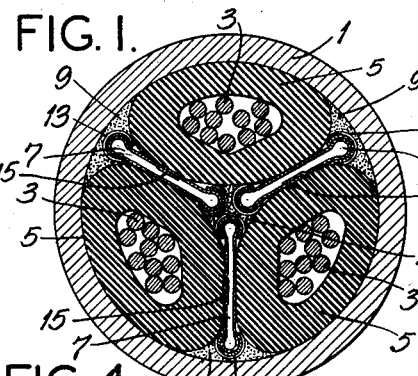

Referring now more particularly to Fig. 1, there is illustrated at numeral 1 a cable sheath surrounding three conductors 3. Each conductor is surrounded by suitable insulation 5, and between the insulated conductors are laid lengths of tubing or tape 7 of hollow construction adapted to relieve against stresses and strains engendered when conductors and/or other parts of the cable expand and contract or change shape under operating conditions.

The space between the tape and other elements of the cable is preferably filled with impregnating compound or oil. Also lateral fillers 9 may be used, although this is not absolutely necessary. A filler 11 may also be used at the center of the cable between conductors. The fillers may be somewhat spaced from the edges of the tape 7 as indicated at the numeral 13, thus providing for movement of the tape 7 if expansible.

Figure 2:
Fig. 2 is a trimetric view showing a length of said tubing.
Figure 3:
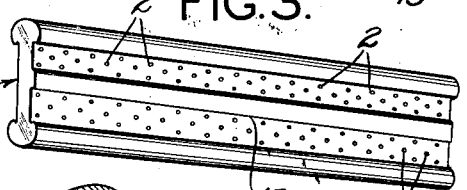
Fig. 3 is a view similar to Fig. 2 showing a perforated form of the invention.

The walls of the hollow tubing or tape may be either pervious or impervious, that is, permeable or impermeable to the impregnating compound or oil, or to other fluids. Fig. 2 shows the impervious form and Fig. 3 shows the pervious form.

If the walls are made pervious, such as, for example, by perforations 2 therethrough, the impregnating compound or oil will pass to and from the tubing and will move therein longitudinally of the cable to and from reservoirs located at suitable intervals.

If the walls of the tubing are impervious to fluids, relief of the stresses engendered will be afforded by changes in cross-sectional area of the tubing. If the fluid within the tubing is a gas, it will change in volume and/or move longitudinally of the cable to and from reservoirs or openings to the outside air, which are located at suitable intervals. If the fluid within the tubing is a liquid, it will move longitudinally of the cable to and from reservoirs located at suitable intervals.

The hollow tube or tubes may be located at other places in the cable than between the insulated conductors, such as, for example, in the lateral filler spaces, in the conductor or under the lead sheath. The cross-sectional shape of the hollow tubing may be elliptical, oval, round, trifurcated, flat, or other shape adapted to conform to the space available or suitable for securing the desired change in area cross-section.

As shown at numeral 15 (Fig. 1), the tape is provided with a seam or joint during the manufacture thereof.

Fig. 2 illustrates the general character of the tape or tubing which comprises a more or less flat, thin strip of metal 17 which in this embodiment is suitably bent or curved into a flat shape and the edges formed to effect said seam 15. As stated, this strip of metal may be perforated in case a pervious tube wall is desired (see Fig. 3).

Figure 4:
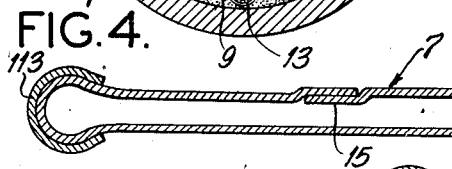
Fig. 4 is an enlarged cross section showing a preferred form of the invention.

Fig. 4 illustrates the structure with an outside reenforcing strip 113 for the purpose of decreasing the flexure at the edge and increasing the edge strength against crushing pressures.

Figure 5:
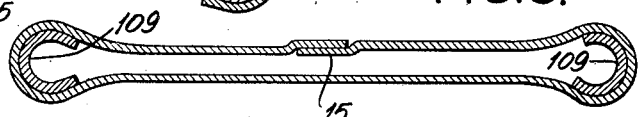
Fig. 5 is a view similar to Fig. 4, showing another form of the invention.

Fig. 5 illustrates the inside reenforcing strip 109 at the edge of a tube also for the purpose of decreasing the flexure at the edge and increasing the edge strength against crushing pressures. The sealing joint is made at 15, thus giving the tube a continuous cross section.

Figure 6:
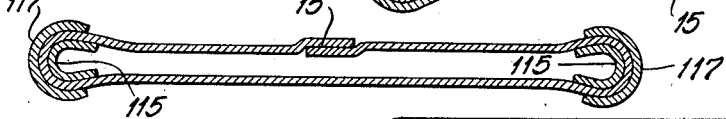
Fig. 6 is a view similar to Fig. 4, showing another form of the invention.

Fig. 6 illustrates the tube with both inside and outside reenforcing strips 115 and 117, respectively.

Figure 7:
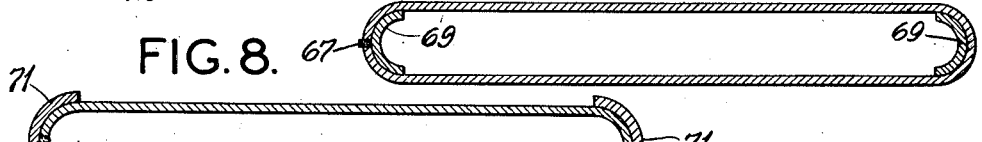
Figs. 7 to 12 are views similar to Fig. 4, showing alternative forms of the invention.
Figure 8:
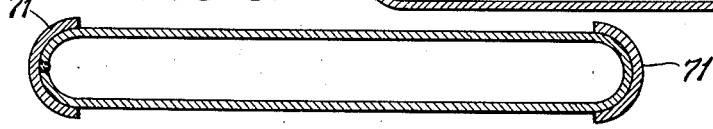

Fig. 7 illustrates a butt-reinforced seam 67 at the edge of the tube, the reinforcing strip 69 being inside the tube and curved to conform to the desired shape. A modification with a reinforcing strip 71 on the outside is illustrated in Fig. 8. These constructions also provide greater strength and stiffness at the edges.

Figure 9:
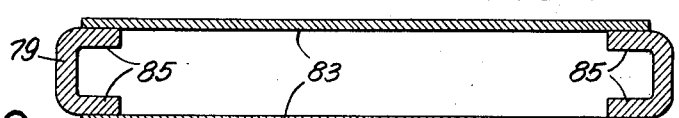
Figure 10:
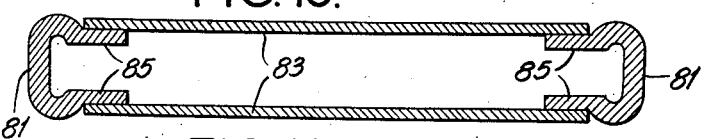

Figs. 9 and 10 illustrate structures in which the change in volume of the tubing also will result entirely from flexing of the side walls 83 of the tube, with the added advantage that the tubes will, without injury, be capable of withstanding greater mechanical pressures at the edges. This is accomplished by making the edge pieces 79 and 81 of heavier material which will not flex materially under internal pressure. These heavy pieces include fastening portions 85 and are essentially U-shaped. It is to be understood that the edge strip may be fastened by soldering, brazing or otherwise, as described in connection with other forms herein.

Figure 11:
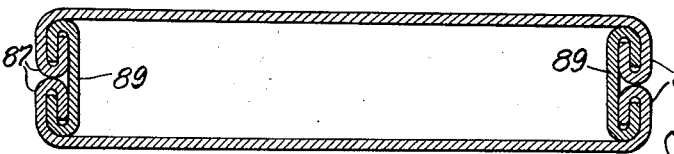
Figure 12:
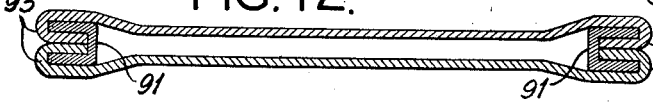

Fig. 11 illustrates an interlock reinforced seam at the edge of the tube which also serves to strengthen the edge against collapse from external pressure. Here the edge pieces 89 are interiorly arranged and of C-shape interlocked with C-shaped edges 87 of the side walls. A similar structure is shown in Fig. 12, except that the degree of interlocking is less, there being a C-shaped strip 91 clamped about the legs C-shaped edges 93 of the tube walls. The tube walls are also formed with an inward bend for increasing flexibility.

It is to be understood that the seams of the hollow tubing will be soldered or welded in those cable structures requiring tubing walls impervious to fluids. In other cable structures soldering or welding of the seam may be utilized merely for mechanical strength or for assuring its integrity.

In view of the above, it will be seen that the several objects of the invention are achieved and other advantageous results attained.

As many changes could be made in carrying out the above constructions without departing from the scope of the invention, it is intended that all matter contained in the above description or shown in the accompanying drawing shall be interpreted as illustrative and not in a limiting sense.

We claim:

1. A cable comprising a conductor, a sheath surrounding said conductor and a liquid insulating medium therefor expansive with increase in temperature, expansion means comprising a hollow tube, said tube being relatively flat and having side walls of a given flexibility and an edge of less flexibility, said edge comprising a U-shaped member affixed externally of the side walls.

2. In a cable, expansion means comprising a hollow tube, said tube being relatively flat and having side walls of a given flexibility and an edge wall having substantially no flexibility, in comparison with the flexibility of the side walls, said edge wall comprising a substantial U-shaped member affixed externally of said side walls.

3. A cable comprising a conductor, a sheath surrounding said conductor and a liquid insulating medium therefor expansive with increase in temperature, expansion means comprising a hollow tube formed from a sheet bent along at least two longitudinal axes to form a tube of relatively flat cross section, the longitudinal edges of said sheet being arranged relatively to form a lap joint, and external reinforcing strips for said bent portions.

4. A cable comprising a conductor, a sheath surrounding said conductor and a liquid insulating medium therefor expansive with increase in temperature, expansion means within the sheath comprising a hollow tube, said tube being formed from a sheet bent along at least one line to juxtapose the longitudinal edges of said sheet and to form a tube of substantially flat cross section, and an exterior reenforcing strip for the bent portion, said sheet having a continuous cross section.

5. In a cable, a sheath, a plurality of conductors in said sheath, insulations about the respective conductors having shapes respectively leaving spaces between them and the sheath, relatively flat expansion tubes between the respective insulations having relatively flexible walls, and relatively inflexible edges in said spaces.

6. In a cable, sheath, a plurality of conductors in said sheath, insulations about the respective conductors having shapes respectively leaving spaces between them and the sheath, relatively flat expansion tubes between the respective insulations having relatively flexible walls, and relatively inflexible reenforced edges in said spaces, said reenforced edges being thicker than the remainders of the tubes respectively.

7. In a cable, a sheath, a plurality of conductors in said sheath, insulations about the respective conductors having shapes respectively leaving spaces between them, both centrally and at the sheath, relatively flat expansion tubes between the respective insulations having each relatively flexible walls, and a pair of relatively inflexible reenforcing edges, one in a central space and one in a peripheral space.

8. In a cable, a sheath, a plurality of conductors in said sheath, insulations about the respective conductors having shapes respectively leaving spaces between them, both centrally and at the sheath, relatively flat expansion tubes between the respective insulations having each relatively flexible walls, and a pair of relatively inflexible reenforcing edges one in a central space and one in a peripheral space, said edges being normally thicker than the remainder of the respective flat tube.

PHILIP H. CHASE.
JOHN R. FALCONER.